US012754689B2

(12) United States Patent
Lee

(10) Patent No.: US 12,754,689 B2
(45) Date of Patent: Oct. 6, 2026

(54) AUTOMOTIVE STORAGE DEVICE INCLUDING AUTOMOTIVE STORAGE CONTROLLER, AND AUTOMOTIVE ELECTRONIC SYSTEM INCLUDING THE SAME

(71) Applicant: Samsung Electronics Co., Ltd., Suwon-si (KR)

(72) Inventor: Seungcheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 18/894,402

(22) Filed: Sep. 24, 2024

(65) Prior Publication Data

US 2025/0284430 A1 Sep. 11, 2025

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0655; G06F 3/0604; G06F 3/0679; G06F 3/0614; G06F 3/0658; G06F 2212/1016; G06F 2212/1032; B60R 16/0231
See application file for complete search history.

(56) References Cited

U.S. PATENT DOCUMENTS

| | | | |
|---|---|---|---|
| 11,144,027 | B2 | 10/2021 | Capodanno et al. |
| 11,663,036 | B2 | 5/2023 | Duluk, Jr. et al. |
| 2021/0073025 | A1 | 3/2021 | Duluk, Jr. et al. |
| 2023/0185904 | A1 | 6/2023 | Chitnis et al. |

FOREIGN PATENT DOCUMENTS

| | | | | |
|---|---|---|---|---|
| CN | 109747480 A | 5/2019 | | |
| CN | 116467094 A | 7/2023 | | |
| KR | 10-2023-0111002 A | 7/2023 | | |
| WO | WO-2018139296 A1 * | 8/2018 | ............. | H04L 67/34 |
| WO | WO-2018142751 A1 * | 8/2018 | ............... | G06F 8/65 |

OTHER PUBLICATIONS

Mitra et al., Soft Error Resilient System Design through Error Correction. IEEE 2006 IFIP International Conference on Very Large Scale Integration. 332-337.

Tung et al., A One-Cycle Correction Error-Resilient Flip-Flop for Variation-Tolerant Designs on an FPGA. MDPI. Electronics. Apr. 10, 2020;9(633). 12 pages.

* cited by examiner

*Primary Examiner* — Long T Tran
*Assistant Examiner* — Charles J Brauch
(74) *Attorney, Agent, or Firm* — Wolf, Greenfield & Sacks, P.C.

(57) ABSTRACT

An automotive storage device includes: a nonvolatile memory device configured to store data; and a storage controller configured to receive a first request from a first host, control the nonvolatile memory device so that the nonvolatile memory device performs an operation corresponding to the first request by using a first function including a first physical function, receive a second request from a second host having a safety integrity level that is different from that of the first host, and control the nonvolatile memory device so that the nonvolatile memory device performs an operation corresponding to the second request by using a second function including a second physical function.

20 Claims, 12 Drawing Sheets

50

500

AUTOMOTIVE STORAGE DEVICE INCLUDING AUTOMOTIVE STORAGE CONTROLLER, AND AUTOMOTIVE ELECTRONIC SYSTEM INCLUDING THE SAME

CROSS-REFERENCE TO RELATED APPLICATIONS

This application claims priority to and the benefit under 35 U.S.C. § 119(a)-(d) of Korean Patent Application No. 10-2024-0031438 filed on Mar. 5, 2024, in the Korean Intellectual Property Office, the entire contents of which are incorporated herein by reference.

FIELD

The present disclosure relates to an automotive storage device including an automotive storage controller, and an automotive electronic system including the same.

BACKGROUND

A vehicle may include an automotive storage device that stores data generated while the vehicle (e.g., automobile) is being driven and host devices that control the automotive storage device. Host devices may have different safety integrity levels (SIL) depending on the safety required for operations performed in the vehicle. The automotive storage device may need to process requests received from the host device with a high safety integrity level with no more errors than requests received from a host device with a low safety integrity level.

SUMMARY

The present disclosure attempts to provide a storage device including a storage controller for preventing errors of functions used to requests received from an outside, and an electronic system including the same.

An embodiment of the present disclosure provides an automotive storage device including: a nonvolatile memory device configured to store data; and a storage controller configured to receive a first request from a first host, control the nonvolatile memory device so that the nonvolatile memory device performs an operation corresponding to the first request by using a first function including a first physical function, receive a second request from a second host having a safety integrity level that is different from that of the first host, and control the nonvolatile memory device so that the nonvolatile memory device performs an operation corresponding to the second request by using a second function including a second physical function.

Another embodiment of the present disclosure provides an automotive storage controller including: first registers configured to store a first function including a first physical function; second registers configured to store a second function including a second physical function; and a processor configured to receive a first request corresponding to a first safety integrity level from outside the automotive storage controller, generate a command for performing an operation corresponding to the first request based on the first function, receive a second request corresponding to a second safety integrity level from outside the automotive storage controller, generate a command for performing an operation corresponding to the second request based on the second function, and detect generation of errors of the second function while accessing the second registers.

Another embodiment of the present disclosure provides an automotive electronic system including: a first host processor with a first safety integrity level; a second host processor with a second safety integrity level that is higher than the first safety integrity level; and an automotive storage device configured to perform an operation corresponding to a first request of the first host processor based on a first function including a first physical function in response to the first request, and perform an operation corresponding to a second request of the second host processor based on a second function including a second physical function in response to the second request.

DETAILED DESCRIPTION

Figure 1:
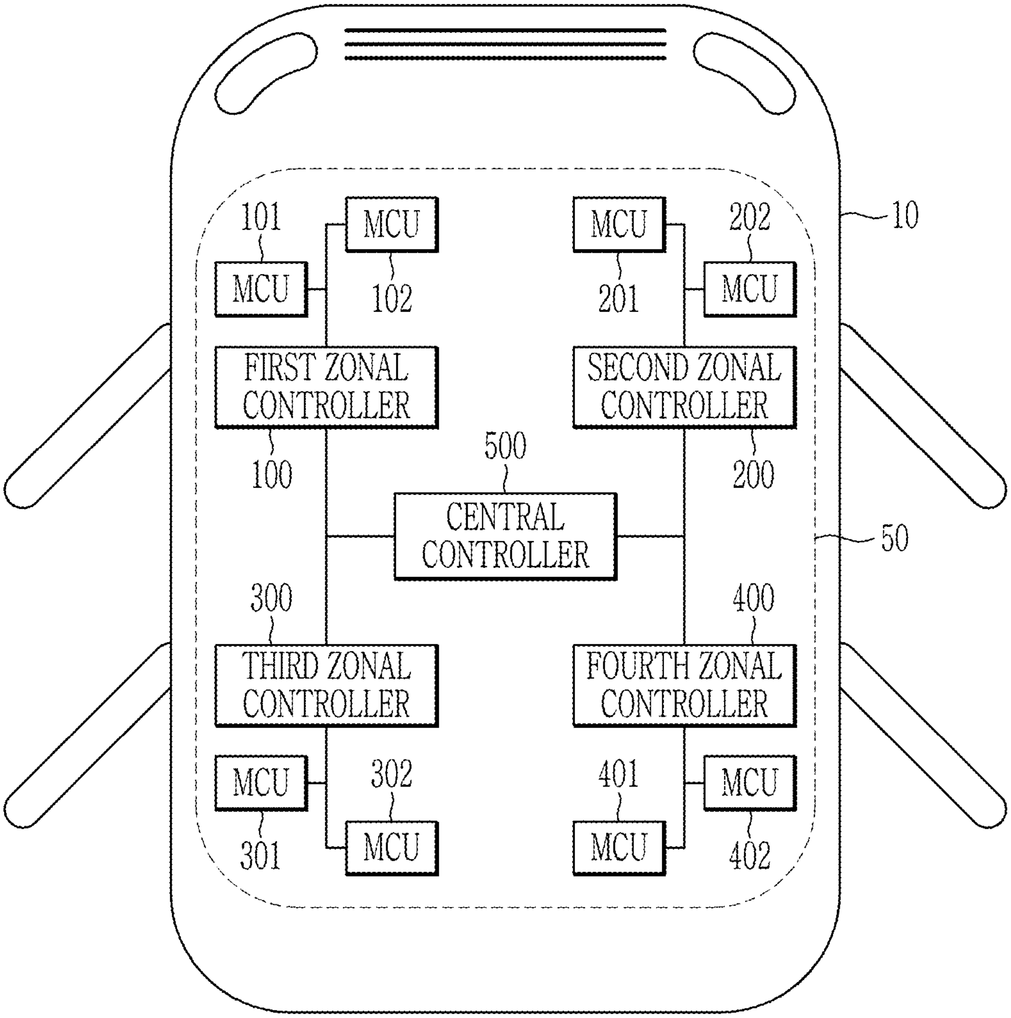
FIG. 1 shows a vehicle including an electronic system according to an embodiment.

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

Parts that are irrelevant to the description will be omitted to clearly describe the present disclosure, and the same elements will be designated by the same reference numerals throughout the specification.

Unless explicitly described to the contrary, the word “comprise”, and variations such as “comprises” or “comprising”, will be understood to imply the inclusion of stated elements but not the exclusion of any other elements.

FIG. 1 shows a vehicle including an electronic system according to an embodiment.

Referring to FIG. 1, the vehicle 10 may include an electronic system 50. The electronic system 50 may process data generated in the vehicle 10. The electronic system 50 may include a first zonal controller 100, a second zonal controller 200, a third zonal controller 300, a fourth zonal controller 400, a center controller 500, and micro control units (MCUs) 101, 102, 201, 202, 301, 302, 401, and 402.

The MCUs 101, 102, 201, 202, 301, 302, 401, and 402 may control operations performed by the vehicle based on information obtained from inside and/or outside of the vehicle. In an embodiment, the MCUs 101, 102, 201, 202, 301, 302, 401, and 402 may control rotation rates of a motor based on information received from an acceleration pedal and a brake pedal. In an embodiment, the MCUs 101, 102, 201, 202, 301, 302, 401, and 402 may control heating wires of sheets in the vehicle based on temperature information received from a temperature sensor in the vehicle.

The first zonal controller 100, the second zonal controller 200, the third zonal controller 300, and the fourth zonal controller 400 may control the MCUs 101, 102, 201, 202, 301, 302, 401, and 402.

In an embodiment, the first zonal controller 100 may receive data from the MCUs 101 and 102 and may control operations of the MCUs 101 and 102. In an embodiment, the second zonal controller 200 may receive data from the MCUs 201 and 202, and may control operations of the MCUs 201 and 202. In an embodiment, the third zonal controller 300 may receive data from the MCUs 301 and 302, and may control operations of the MCUs 301 and 302. In an embodiment, the fourth zonal controller 400 may receive data from the MCUs 401 and 402, and may control operations of the MCUs 401 and 402.

The center controller 500 may control a general operation of the electronic system 50. In an embodiment, the center controller 500 may receive data from the first zonal controller 100, the second zonal controller 200, the third zonal controller 300, and the fourth zonal controller 400. The center controller 500 may control operations of the first zonal controller 100, the second zonal controller 200, the third zonal controller 300, and the fourth zonal controller 400.

In an embodiment, the center controller 500 may process data relating to an advanced driver assistance system (ADAS). In an embodiment, the advanced driver assistance system may include a lane departure warning (LDW), a lane keeping assist (LKA), a high beam assist (HBA), an autonomous emergency braking (AEB), a traffic sign recognition (TSR), a smart cruise control (SCC), a blind spot detection (BSD), and/or a forward collision-avoidance assist (FCA).

For example, the center controller 500 may control a speaker in the vehicle 10 to output a warning sound and notify a driver that the vehicle 10 is not in a driving lane based on lane information received from a sensor for detecting lanes.

In an embodiment, the center controller 500 may process data relating to in-vehicle infotainment (IVI). For example, the center controller 500 may control to output image information displaying movies, TV, and navigation functions through a display in the vehicle 10.

In an embodiment, the center controller 500 may store the data received from the first zonal controller 100, the second zonal controller 200, the third zonal controller 300, and the fourth zonal controller 400. In an embodiment, the center controller 500 may store data relating to the advanced driver assistance system and the in-vehicle infotainment.

Figure 2:
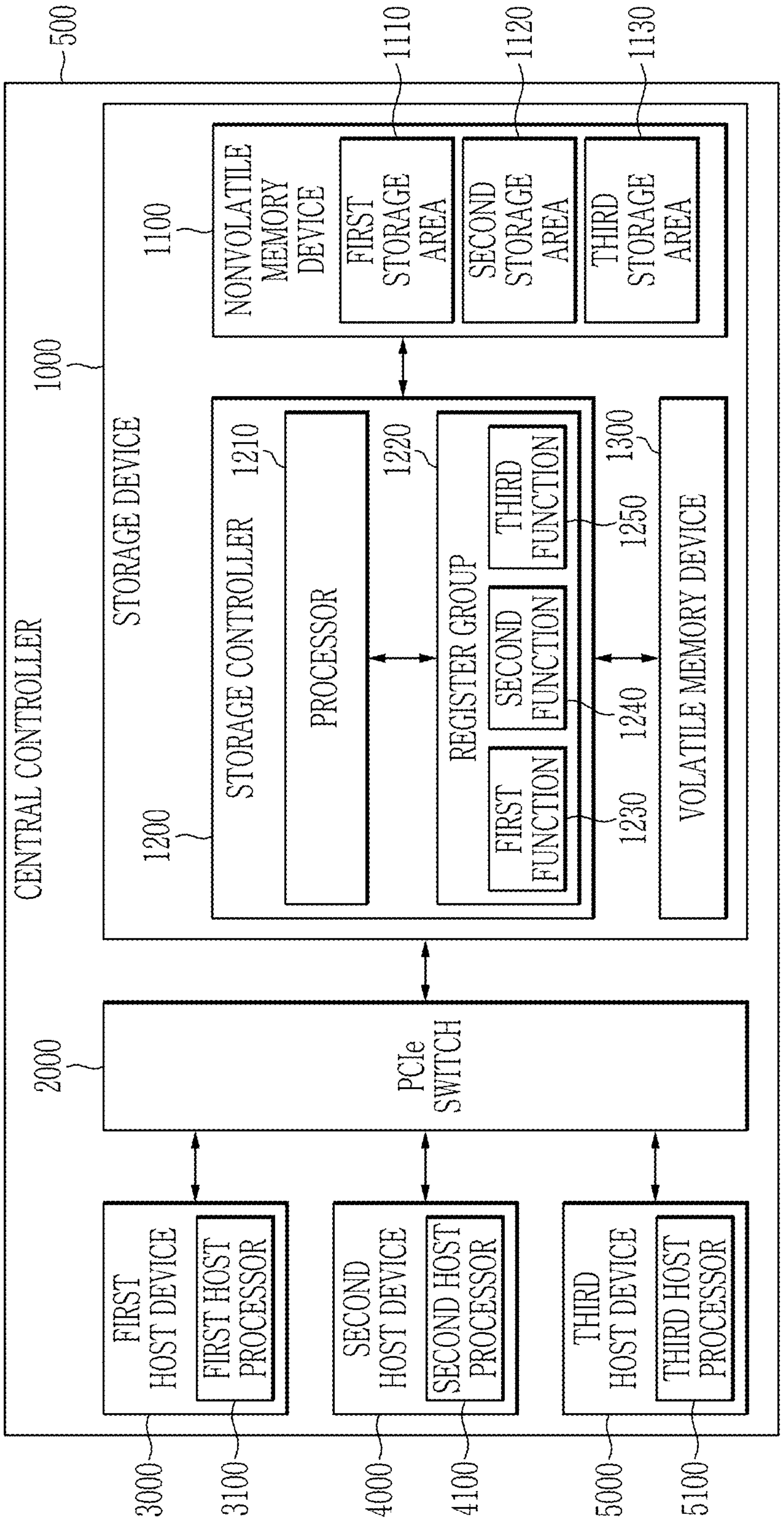
FIG. 2 shows an electronic system including a center controller according to an embodiment.

FIG. 2 shows an electronic system including a center controller according to an embodiment.

Referring to FIG. 2, the electronic system 50 may include a center controller 500. The center controller 500 may include a storage device 1000, a peripheral component interconnect express (PCIe) switch 2000, a first host device 3000, a second host device 4000, and a third host device 5000.

The first host device 3000, the second host device 4000, and the third host device 5000 may receive data from the first to fourth zonal controllers 100, 200, 300, and 400. The first host device 3000, the second host device 4000, and the third host device 5000 may provide data to the storage device 1000 through the PCIe switch 2000. In an embodiment, the first host device 3000, the second host device 4000, and the third host device 5000 may be a system on chip (SoC).

In an embodiment, each of the first host device 3000, the second host device 4000, and the third host device 5000 may have a different safety integrity level (SIL). In an embodiment, the safety integrity level may be an automotive safety integrity level (ASIL) defined by the ISO 26262.

The safety integrity level may indicate degrees of safety required on the operations performed by the first host device 3000, the second host device 4000, and the third host device 5000. In an embodiment, the safety integrity level may represent the degree on which the operation performed by the host device does not malfunction. In an embodiment, the safety integrity level may represent the degree on which the operation performed by the host device does not generate errors.

In an embodiment, the first host device 3000 may have a first safety integrity level, the second host device 4000 may have a second safety integrity level that is higher than the first safety integrity level, and the third host device 5000 may have a third safety integrity level that is higher than the first safety integrity level and is lower than the second safety integrity level.

For example, the first safety integrity level may correspond to a quality management (QM) level, the second safety integrity level may correspond to an ASIL-D, and the third safety integrity level may correspond to an ASIL-B.

In another embodiment, the first host device 3000 may have the first safety integrity level, and the second host device 4000 and the third host device 5000 may have the second safety integrity level. For example, the first host device 3000 may correspond to the QM level, and the second host device 4000 and the third host device 5000 may correspond to the ASIL-D.

In an embodiment, the first host device 3000, the second host device 4000, and the third host device 5000 may be required to have the safety that corresponds to the corresponding safety integrity level. In an embodiment, the first host device 3000 may perform an operation that has the safety required by the first safety integrity level. The second host device 4000 may perform an operation that has the safety required by the second safety integrity level. The third host device 5000 may perform an operation that has the safety required by the third safety integrity level.

In an embodiment, the first host device 3000 with the first safety integrity level may perform an operation requiring lower safety than the second host device 4000 with the second safety integrity level that is higher than the first safety integrity level. The second host device 4000 with the second safety integrity level may perform an operation requiring higher safety than the third host device 5000 with the third safety integrity level that is lower than the second safety integrity level. The first host device 3000 with the first safety integrity level may perform an operation requiring lower safety than the third host device 5000 with the third safety integrity level that is higher than the first safety integrity level.

For example, the first host device 3000 with the first safety integrity level that corresponds to the QM level may perform an operation for processing the data relating to the in-vehicle infotainment that is an operation requiring lower safety than the ASIL-D. The second host device 4000 with the second safety integrity level that corresponds to the ASIL-D may perform an operation for processing the data relating to control of an air bag, an anti-lock brake, and a power steering that are operations requiring higher safety than the QM level. The third host device 5000 with the third safety integrity level that corresponds to the ASIL-B may perform an operation for processing the data relating to a rear-view camera or control such as a stop that are operations requiring lower safety than the ASIL-D.

For another example, the first host device 3000 with the first safety integrity level may perform an operation for processing the data relating to the in-vehicle infotainment, and the second host device 4000 and the third host device 5000 with the second safety integrity level that is higher than the first safety integrity level may perform an operation for processing the data relating to the ADAS.

In an embodiment, the first host device 3000 may include a first host processor 3100. The first host processor 3100 may control a general operation of the first host device 3000. The second host device 4000 may include a second host processor 4100. The second host processor 4100 may control a general operation of the second host device 4000. The third host device 5000 may include a third host processor 5100. The third host processor 5100 may control a general operation of the third host device 5000.

In an embodiment, the first host processor 3100 may control an operation that corresponds to the first safety integrity level. The second host processor 4100 may control an operation that corresponds to the second safety integrity level. The third host processor 5100 may control an operation that corresponds to the third safety integrity level.

The PCIe switch 2000 may control data communication between the first host device 3000, the second host device 4000, and the third host device 5000, and the storage device 1000. The data generated by the first host device 3000, the second host device 4000, and the third host device 5000 may be provided to the storage device 1000 through the PCIe switch 2000. The data stored in the storage device 1000 may be provided to the first host device 3000, the second host device 4000, and the third host device 5000 through the PCIe switch 2000.

The storage device 1000 may include a nonvolatile memory device 1100, a storage controller 1200, and a volatile memory device 1300.

The nonvolatile memory device 1100 may store data. The nonvolatile memory device 1100 may be operated in response to control by the storage controller 1200. In an embodiment, the nonvolatile memory device 1100 may be a NAND flash memory.

The nonvolatile memory device 1100 may receive commands and addresses from the storage controller 1200, and may perform an operation, instructed by the command, on an area selected by the address. The nonvolatile memory device 1100 may perform a program operation (or a write operation) for storing data in the area selected by the address, a read operation for reading data, or an erase operation for deleting data.

In an embodiment, the nonvolatile memory device 1100 may include storage areas. In an embodiment, the nonvolatile memory device 1100 may include a first storage area 1110, a second storage area 1120, and a third storage area 1130. In an embodiment, the first storage area 1110, the second storage area 1120, and the third storage area 1130 may include memory blocks. In an embodiment, the first storage area 1110, the second storage area 1120, and the third storage area 1130 may include name spaces.

The storage controller 1200 may control a general operation of the storage device 1000.

In an embodiment, the storage controller 1200 may control the nonvolatile memory device 1100 to perform a write operation, a read operation, or an erase operation according to requests by the first host device 3000, the second host device 4000, and the third host device 5000. The storage controller 1200 may provide a write command, an address, and data to the nonvolatile memory device 1100 during the write operation. The storage controller 1200 may provide a read command and an address to the nonvolatile memory device 1100 during the read operation. The storage controller 1200 may provide an erase command and an address to the nonvolatile memory device 1100 during the erase operation.

In an embodiment, the storage controller 1200 may include a processor 1210 and a register group 1220. The processor 1210 may control a general operation of the storage controller 1200. The processor 1210 may control the nonvolatile memory device 1100 to perform operations that correspond to the requests received from the first host device 3000, the second host device 4000, and the third host device 5000 by using the functions stored in the register group 1220.

The register group 1220 may include registers. The registers included in the register group 1220 may store a first function 1230, a second function 1240, and a third function 1250. The first function 1230, the second function 1240, and the third function 1250 may include commands used in performing operations that correspond to the requests received from the first host device 3000, the second host device 4000, and the third host device 5000.

In an embodiment, the first function 1230, the second function 1240, and the third function 1250 may respectively include a physical function and virtual functions. In an embodiment, the physical function and the virtual functions may support single root I/O virtualization (SR-IOV) between the first host device 3000, the second host device 4000, or the third host device 5000 and the storage device 1000.

The physical function may be used to perform an operation that corresponds to the request received from the first host device 3000, the second host device 4000, or the third host device 5000. The virtual functions may be used to store or read the data generated by virtual machines, operating systems, or applications performed by the first host device 3000, the second host device 4000, or the third host device 5000. In an embodiment, the virtual functions may include some of the commands included in the physical function. In an embodiment, the number of the virtual functions is changeable according to the numbers of the virtual machines, operating systems, or applications executed by the first host device 3000, the second host device 4000, or the third host device 5000.

In an embodiment, the processor 1210 may receive requests from the first host device 3000, the second host device 4000, and the third host device 5000, and may control the nonvolatile memory device 1100 to perform operations that correspond to the requests by using the first function

1230, the second function 1240, and the third function 1250 including different physical functions.

In an embodiment, the processor 1210 may control the nonvolatile memory device 1100 to perform an operation that corresponds to the first request based on the first function 1230 that includes the first physical function in response to the first request received from the first host device 3000. The operation that corresponds to the first request may include a write operation for storing the data received from the first host device 3000 in the nonvolatile memory device 1100 or a read operation for providing the data stored in the nonvolatile memory device 1100 to the first host device 3000.

In an embodiment, the processor 1210 may allocate the first storage area 1110 for storing the data received from the first host device 3000 based on the first function 1230. The processor 1210 may control the nonvolatile memory device 1100 to store the data received from the first host device 3000 in the first storage area 1110 based on the first function 1230.

In an embodiment, the processor 1210 may control the nonvolatile memory device 1100 to perform an operation that corresponds to the second request based on the second function 1240 including the second physical function in response to the second request received from the second host device 4000.

In an embodiment, the processor 1210 may allocate the second storage area 1120 for storing the data received from the second host device 4000 based on the second function 1240. The processor 1210 may control the nonvolatile memory device 1100 to store the data received from the second host device 4000 in the second storage area 1120 based on the second function 1240.

In an embodiment, the processor 1210 may control the nonvolatile memory device 1100 to perform an operation that corresponds to the third request based on the third function 1250 including the third physical function in response to the third request received from the third host device 5000.

In an embodiment, the processor 1210 may allocate the third storage area 1130 for storing the data received from the third host device 5000 based on the third function 1250. The processor 1210 may control the nonvolatile memory device 1100 to store the data received from the third host device 5000 in the third storage area 1130 based on the third function 1250.

In an embodiment, the second function 1240 and the third function 1250 may include an error detection function. The error detection function may detect generation of errors of the second function 1240 and the third function 1250, and may be used to a recovery operation for correcting errors.

The volatile memory device 1300 may temporarily store the data provided by the first host device 3000, the second host device 4000, and the third host device 5000, or may temporarily store the data read from the nonvolatile memory device 1100. In an embodiment, the volatile memory device 1300 may be a dynamic random access memory (DRAM) or a static random access memory (SRAM). In an embodiment, the volatile memory device 1300 may be disposed inside/outside the storage controller 1200.

Figure 3:
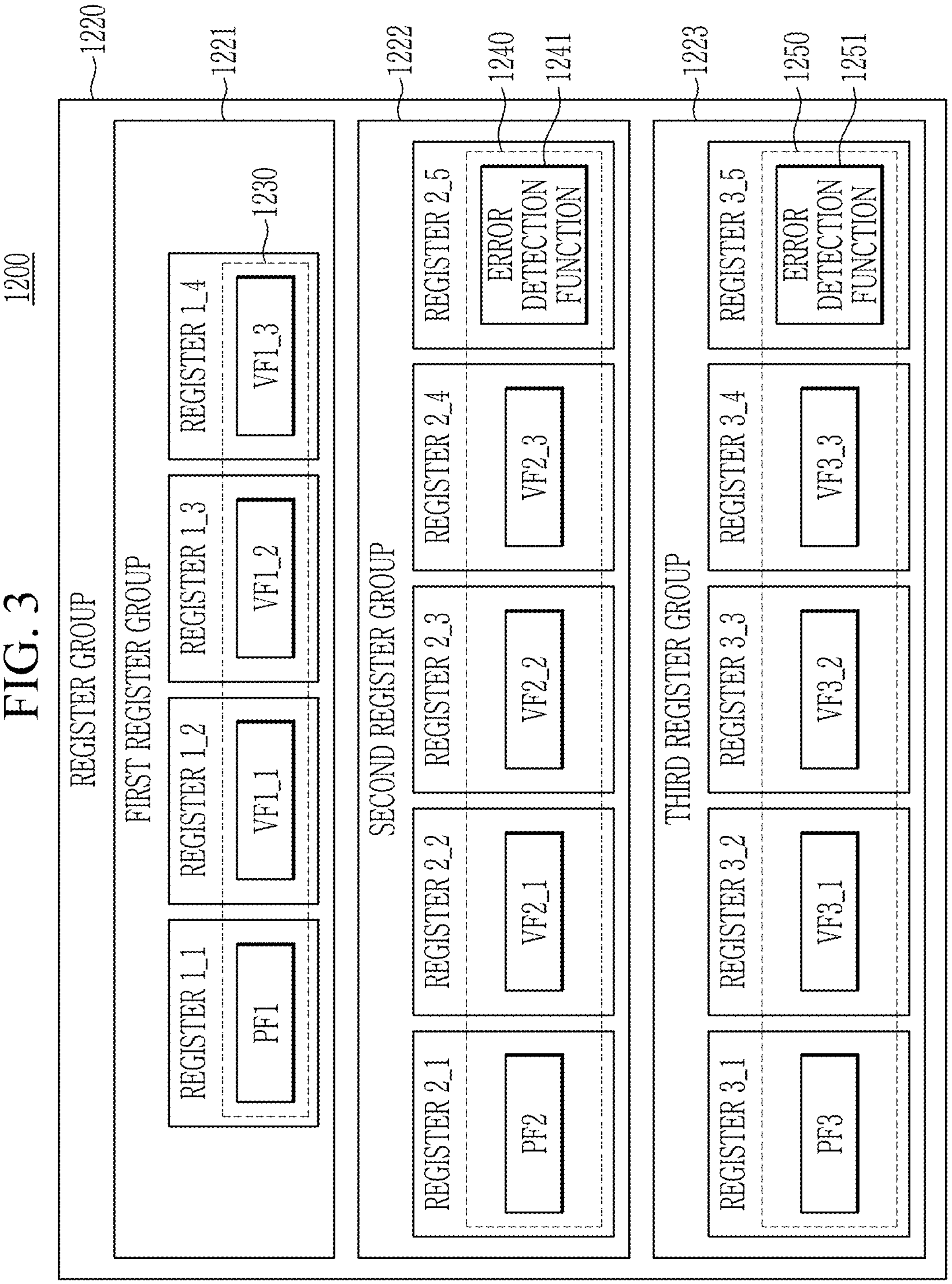
FIG. 3 shows a register group for storing functions according to an embodiment.

FIG. 3 shows a register group for storing functions according to an embodiment.

Referring to FIG. 3, the storage controller 1200 may include a register group 1220. The register group 1220 may include a first register group 1221, a second register group 1222, and a third register group 1223.

The first register group 1221, the second register group 1222, and the third register group 1223 may respectively include registers. The first register group 1221 may store the first function 1230. The first function 1230 may include a first physical function PF1, a first_1 virtual function VF1_1, a first_2 virtual function VF1_2, and a first_3 virtual function VF1_3.

In an embodiment, the first register group 1221 may include a first_1 register REGISTER 1_1, a first_2 register REGISTER 1_2, a first_3 register REGISTER 1_3, and a first_4 register REGISTER 1_4. The first_1 register REGISTER 1_1 may store the first physical function PF1. The first_2 register REGISTER 1_2 may store the first_1 virtual function VF1_1. The first_3 register REGISTER 1_3 may store the first_2 virtual function VF1_2. The first_4 register REGISTER 1_4 may store the first_3 virtual function VF1_3. FIG. 3 has shown the case in which one physical function or one virtual function is stored in one register. In an embodiment, one physical function or one virtual function may be stored in the registers.

In an embodiment, the second register group 1222 may store the second function 1240. The second function 1240 may include a second physical function PF2, a second_1 virtual function VF2_1, a second_2 virtual function VF2_2, a second_3 virtual function VF2_3, and an error detection function 1241. The error detection function 1241 may detect generation of errors of the second function 1240, and may correct errors of the second function 1240. The error detection function 1241 may allow or restrict an access to the second register group 1222 in which the second function 1240 is stored.

In an embodiment, the second register group 1222 may include a second_1 register REGISTER 2_1, a second_2 register REGISTER 2_2, a second_3 register REGISTER 2_3, a second_4 register REGISTER 2_4, and a second_5 register REGISTER 2_5. The second_1 register REGISTER 2_1 may store the second physical function PF2. The second_2 register REGISTER 2_2 may store the second_1 virtual function VF2_1. The second_3 register REGISTER 2_3 may store the second_2 virtual function VF2_2. The second_4 register REGISTER 2_4 may store the second_3 virtual function VF2_3. The second_5 register REGISTER 2_5 may store the error detection function 1241.

In an embodiment, the third register group 1223 may store the third function 1250. The third function 1250 may include a third physical function PF3, a third_1 virtual function VF3_1, a third_2 virtual function VF3_2, a third_3 virtual function VF3_3, and an error detection function 1251. The error detection function 1251 may detect generation of errors of the third function 1250, and may correct errors of the third function 1250. The error detection function 1251 may allow or restrict the access to the third register group 1223 in which the third function 1250 is stored.

In an embodiment, the third register group 1223 may include a third_1 register REGISTER 3_1, a third_2 register REGISTER 3_2, a third_3 register REGISTER 3_3, a third_4 register REGISTER 3_4, and a third_5 register REGISTER 3_5. The third_1 register REGISTER 3_1 may store the third physical function PF3. The third_2 register REGISTER 3_2 may store the third_1 virtual function VF3_1. The third_3 register REGISTER 3_3 may store the third_2 virtual function VF3_2. The third_4 register REGISTER 3_4 may store the third_3 virtual function VF3_3. The third_5 register REGISTER 3_5 may store the error detection function 1251.

Figure 4:
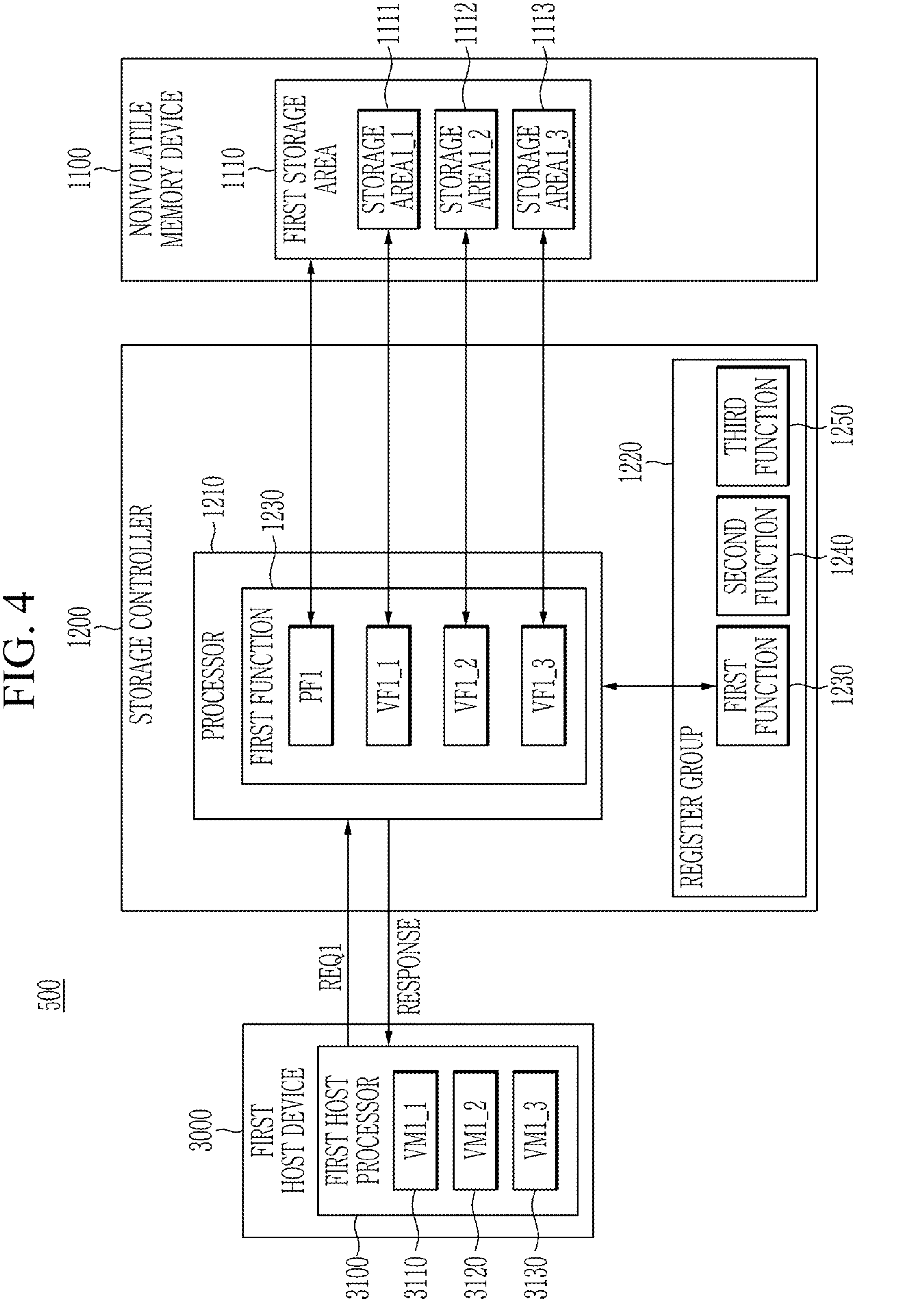
FIG. 4 shows a storage device for performing an operation that corresponds to a first request of a first host device according to an embodiment.

FIG. 4 shows a storage device for performing an operation that corresponds to a first request of a first host device according to an embodiment.

Referring to FIG. 4, the center controller 500 may include a first host device 3000, a storage controller 1200, and a nonvolatile memory device 1100.

In an embodiment, the first host device 3000 may have the first safety integrity level. For example, the first safety integrity level may correspond to the QM level.

The first host device 3000 may include a first host processor 3100. The storage controller 1200 may include a processor 1210 and a register group 1220. The nonvolatile memory device 1100 may include the first storage area 1110. The first storage area 1110 may include a first_1 storage area 1111, a first_2 storage area 1112, and a first_3 storage area 1113.

In an embodiment, the first host processor 3100 may execute virtual machines, operating systems, or applications. In an embodiment, the first host processor 3100 may execute the first_1 virtual machine 3110, the first_2 virtual machine 3120, and the first_3 virtual machine 3130.

In an embodiment, the first host processor 3100 may control an operation that corresponds to the first safety integrity level. For example, the operation that corresponds to the first safety integrity level may process the data relating to the in-vehicle infotainment. In an embodiment, the first host processor 3100 may transmit a first request REQ1 for instructing to store or read the data used to the operation that corresponds to the first safety integrity level to the storage controller 1200.

The storage controller 1200 may receive the first request REQ1 from the first host processor 3100. In an embodiment, the first request REQ1 may correspond to the first safety integrity level. For example, the first request REQ1 that corresponds to the first safety integrity level may instruct to store or read the data relating to the in-vehicle infotainment.

The storage controller 1200 may control the nonvolatile memory device 1100 to perform an operation that corresponds to the first request REQ1 based on the first function 1230 in response to the first request REQ1. In an embodiment, the operation that corresponds to the first request REQ1 may include a write operation for storing the data received from the first host processor 3100 in the nonvolatile memory device 1100. The operation that corresponds to the first request REQ1 may include a read operation for providing the data read from the nonvolatile memory device 1100 to the first host processor 3100.

In an embodiment, the processor 1210 may receive the first request REQ1 from the first host processor 3100. The processor 1210 may access the register group 1220 in response to the first request REQ1, and may obtain the first function 1230 stored in the register group 1220. The first function 1230 may include a first physical function PF1, a first_1 virtual function VF1_1, a first_2 virtual function VF1_2, and a first_3 virtual function VF1_3.

In an embodiment, the processor 1210 may control the nonvolatile memory device 1100 to store the data received from the first host processor 3100 in the first storage area 1110 based on the first physical function PF1 in response to the first request REQ1. The processor 1210 may control the nonvolatile memory device 1100 to read the data stored in the first storage area 1110 based on the first physical function PF1 in response to the first request REQ1. The processor 1210 may provide the data read from the first storage area 1110 to the first host processor 3100 in response to the first request REQ1.

In an embodiment, the processor 1210 may receive the first request REQ1 from the first_1 virtual machine 3110 executed by the first host processor 3100. The processor 1210 may access the register group 1220 in response to the first request REQ1 received from the first_1 virtual machine 3110, and may obtain the first_1 virtual function VF1_1 stored in the register group 1220.

The processor 1210 may control the nonvolatile memory device 1100 to perform an operation that corresponds to the first request REQ1 based on the first_1 virtual function VF1_1 in response to the first request REQ1 received from the first_1 virtual machine 3110. The processor 1210 may control the nonvolatile memory device 1100 to store the data in the first_1 storage area 1111 based on the first_1 virtual function VF1_1. The data generated by the first_1 virtual machine 3110 may be stored in in the first_1 storage area 1111 according to the first request REQ1. The processor 1210 may control the nonvolatile memory device 1100 to read the data stored in the first_1 storage area 1111 based on the first_1 virtual function VF1_1.

In an embodiment, the processor 1210 may receive the first request REQ1 from the first_2 virtual machine 3120 executed by the first host processor 3100. The processor 1210 may access the register group 1220 in response to the first request REQ1 received from the first_2 virtual machine 3120, and may obtain the first_2 virtual function VF1_2 stored in the register group 1220.

The processor 1210 may control the nonvolatile memory device 1100 to perform an operation that corresponds to the first request REQ1 based on the first_2 virtual function VF1_2 in response to the first request REQ1 received from the first_2 virtual machine 3120. The processor 1210 may control the nonvolatile memory device 1100 to store the data in the first_2 storage area 1112 based on the first_2 virtual function VF1_2. The processor 1210 may control the nonvolatile memory device 1100 to read the data stored in the first_2 storage area 1112 based on the first_2 virtual function VF1_2.

In an embodiment, the processor 1210 may receive the first request REQ1 from the first_3 virtual machine 3130 executed by the first host processor 3100. The processor 1210 may access the register group 1220 in response to the first request REQ1 received from the first_3 virtual machine 3130, and may obtain the first_3 virtual function VF1_3 stored in the register group 1220.

The processor 1220 may control the nonvolatile memory device 1100 to perform an operation that corresponds to the first request REQ1 based on the first_3 virtual function VF1_3 in response to the first request REQ1 received from the first_3 virtual machine 3130. The processor 1210 may control the nonvolatile memory device 1100 to store the data in the first_3 storage area 1113 based on the first_3 virtual function VF1_3. The processor 1210 may control the nonvolatile memory device 1100 to read the data stored in the first_3 storage area 1113 based on the first_3 virtual function VF1_3.

In an embodiment, the storage controller 1200 may control the nonvolatile memory device 1100 to perform an operation that corresponds to the first request REQ1 received from the first host device 3000 by using the first function 1230 including the first physical function PF1.

Figure 5:
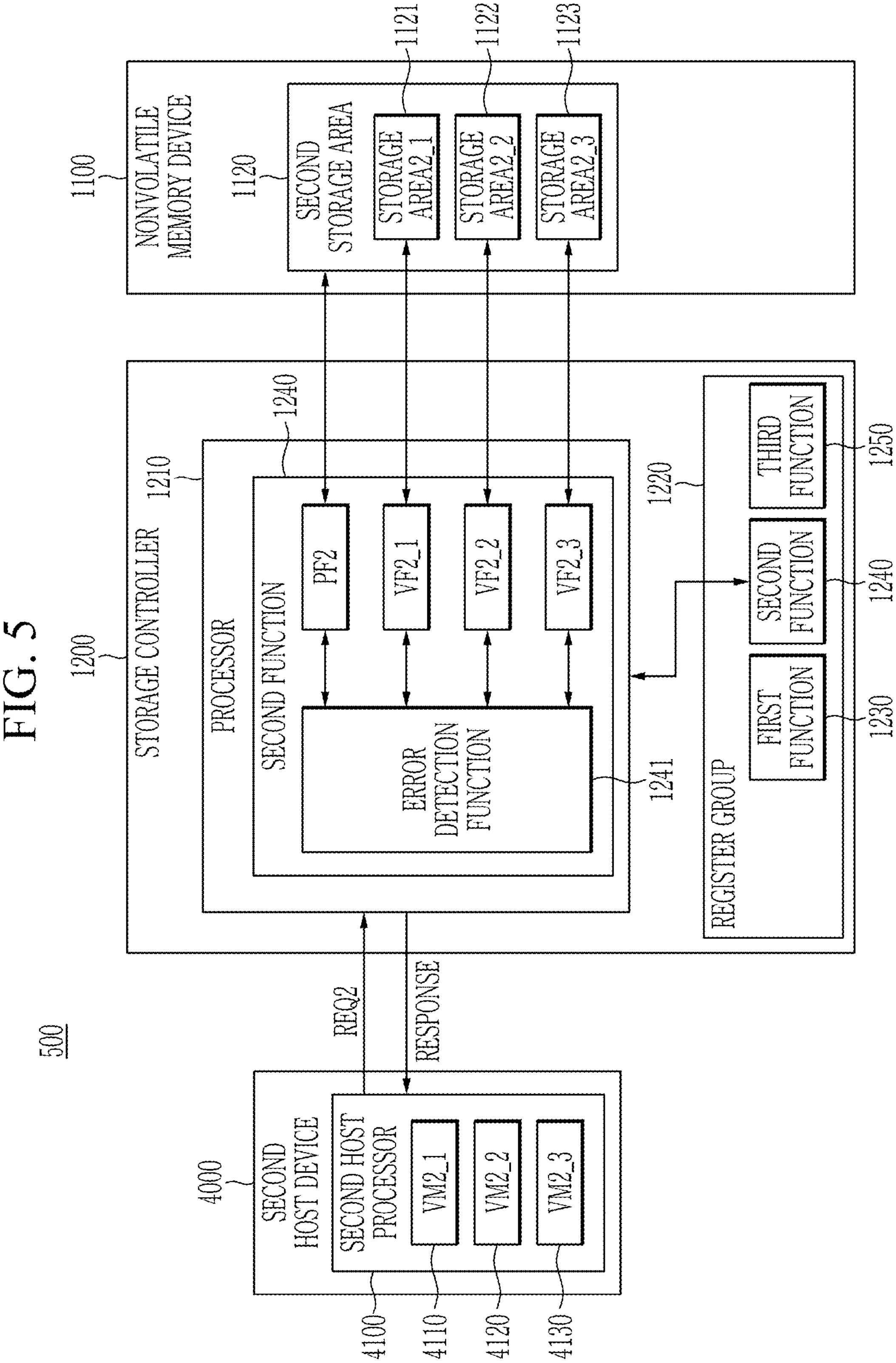
FIG. 5 shows a storage device for performing an operation that corresponds to a second request of a second host device according to an embodiment.

FIG. 5 shows a storage device for performing an operation that corresponds to a second request of a second host device according to an embodiment.

Referring to FIG. 5, the center controller 500 may include a second host device 4000, a storage controller 1200, and a nonvolatile memory device 1100. The second host device 4000 may include a second host processor 4100. The nonvolatile memory device 1100 may include a second storage area 1120. The second storage area 1120 may include a second_1 storage area 1121, a second_2 storage area 1122, and a second_3 storage area 1123.

In an embodiment, the second host device 4000 may have the safety integrity level that is different from that of the first host device 3000. In an embodiment, the second host device 4000 may have the higher second safety integrity level than the first host device 3000 with the first safety integrity level. For example, the first host device 3000 may correspond to the QM level, and the second host device 4000 may correspond to the ASIL-D.

In an embodiment, the second host processor 4100 may execute the virtual machines, the operating systems, or the applications. In an embodiment, the second host processor 4100 may execute the second_1 virtual machine 4110, the second_2 virtual machine 4120, and the second_3 virtual machine 4130.

In an embodiment, the second host processor 4100 may control an operation that corresponds to the second safety integrity level. In an embodiment, the second host processor 4100 may transmit the second request REQ2 instructing to store or read the data used to the operation that corresponds to the second safety integrity level to the storage controller 1200. For example, the operation that corresponds to the second safety integrity level may process the data relating to control of the air bag, the anti-lock brake, and the power steering.

The storage controller 1200 may receive the second request REQ2 from the second host processor 4100. In an embodiment, the second request REQ2 may correspond to the second safety integrity level. For example, the second request REQ2 that corresponds to the second safety integrity level may instruct to store or read the data relating to control of the air bag, the anti-lock brake, and the power steering.

The storage controller 1200 may control the nonvolatile memory device 1100 to perform an operation that corresponds to the second request REQ2 based on the second function 1240 in response to the second request REQ2 of the second host processor 4100. In an embodiment, the operation that corresponds to the second request REQ2 may include a write operation for storing the data received from the second host processor 4100 in the nonvolatile memory device 1100. The operation that corresponds to the second request REQ2 may include a read operation for providing the data read from the nonvolatile memory device 1100 to the second host processor 4100.

In an embodiment, the processor 1210 may access the register group 1220 in response to the second request REQ2, and may obtain the second function 1240 stored in the register group 1220. The second function 1240 may include a second physical function PF2, a second_1 virtual function VF2_1, a second_2 virtual function VF2_2, a second_3 virtual function VF2_3, and an error detection function 1241.

In an embodiment, the processor 1210 may control the nonvolatile memory device 1100 to store the data received from the second host processor 4100 in the second storage area 1120 based on the second physical function PF2 in response to the second request REQ2. The processor 1210 may control the nonvolatile memory device 1100 to read the data stored in the second storage area 1120 based on the second physical function PF2 in response to the second request REQ2.

In an embodiment, the processor 1210 may receive the second request REQ2 from the second_1 virtual machine 4110 executed by the second host processor 4100. The processor 1210 may access the register group 1220 in response to the second request REQ2 received from the second_1 virtual machine 4110, and may obtain the second_1 virtual function VF2_1 stored in the register group 1220.

The processor 1210 may control the nonvolatile memory device 1100 to perform an operation that corresponds to the second request REQ2 based on the second_1 virtual function VF2_1 in response to the second request REQ2 received from the second_1 virtual machine 4110. The processor 1210 may control the nonvolatile memory device 1100 to store the data in the second_1 storage area 1121 that corresponds to the second_1 virtual function VF2_1. The data generated by the second_1 virtual machine 4110 may be stored in the second_1 storage area 1121 according to the second request REQ2. The processor 1210 may control the nonvolatile memory device 1100 to read the data stored in the second_1 storage area 1121 based on the second_1 virtual function VF2_1.

In an embodiment, the processor 1210 may receive the second request REQ2 from the second_2 virtual machine 4120 executed by the second host processor 4100. The processor 1210 may access the register group 1220 in response to the second request REQ2 received from the second_2 virtual machine 4120, and may obtain the second_2 virtual function VF2_2 stored in the register group 1220.

The processor 1210 may control the nonvolatile memory device 1100 to perform an operation that corresponds to the second request REQ2 based on the second_2 virtual function VF2_2 in response to the second request REQ2 received from the second_2 virtual machine 4120. The processor 1210 may control the nonvolatile memory device 1100 to store the data in the second_2 storage area 1122 that corresponds to the second_2 virtual function VF2_2. The processor 1210 may control the nonvolatile memory device 1100 to read the data stored in the second_2 storage area 1122 based on the second_2 virtual function VF2_2.

In an embodiment, the processor 1210 may receive the second request REQ2 from the second_3 virtual machine 4130 executed by the second host processor 4100. The processor 1210 may access the register group 1220 in response to the second request REQ2 received from the second_3 virtual machine 4130, and may obtain the second_3 virtual function VF2_3 stored in the register group 1220.

The processor 1210 may control the nonvolatile memory device 1100 to perform an operation that corresponds to the second request REQ2 based on the second_3 virtual function VF2_3 in response to the second request REQ2 received from the second_3 virtual machine 4130. The processor 1210 may control the nonvolatile memory device 1100 to store the data in the second_3 storage area 1123 that corresponds to the second_3 virtual function VF2_3. The processor 1210 may control the nonvolatile memory device 1100 to read the data stored in the second_3 storage area 1123 based on the second_3 virtual function VF2_3.

In an embodiment, the processor 1210 may obtain the error detection function 1241 from the second register group 1222 in which the second function 1240 is stored from among the register groups included in the register group 1220 in response to the second request REQ2 received from the second host processor 4100.

In an embodiment, the error detection function 1241 may detect the error generated by the second function 1240. In an embodiment, the error detection function 1241 may detect whether the errors are generated to the second physical function PF2, second_1 virtual function VF2_1, the second_2 virtual function VF2_2, and the second_3 virtual function VF2_3 while the processor 1210 accesses the registers in which the second physical function PF2, the second_1 virtual function VF2_1, the second_2 virtual function VF2_2, and the second_3 virtual function VF2_3 are stored in response to the second request REQ2.

In an embodiment, the error detection function 1241 may perform a recovery operation for correcting the errors generated by the second physical function PF2, the second_1 virtual function VF2_1, the second_2 virtual function VF2_2, and the second_3 virtual function VF2_3. In an embodiment, the recovery operation may reset the registers in which the second physical function PF2, the second_1 virtual function VF2_1, the second_2 virtual function VF2_2, and the second_3 virtual function VF2_3 are stored, or may reset the storage controller 1200.

In an embodiment, the error detection function 1241 may provide information on the errors generated by the second physical function PF2, the second_1 virtual function VF2_1, the second_2 virtual function VF2_2, and the second_3 virtual function VF2_3 to the second host processor 4100.

In an embodiment, the error detection function 1241 may control the access to the second register group 1222 storing the second physical function PF2, the second_1 virtual function VF2_1, the second_2 virtual function VF2_2, and the second_3 virtual function VF2_3 based on access right information included in the second request REQ2. The access right information may include access allow information indicating that there is a right to access the second register group 1222 or access prohibit information indicating that there is no right to access the second register group 1222.

In an embodiment, the error detection function 1241 may allow the access to the second register group 1222 when the access right information included in the second request REQ2 includes access allow information. The error detection function 1241 may prohibit the access to the second register group 1222 when the access right information included in the second request REQ2 includes access prohibit information.

In an embodiment, the storage controller 1200 may control the nonvolatile memory device 1100 to perform an operation that corresponds to the second request REQ2 received from the second host device 4000 by using the second function 1240 including the second physical function PF2.

In an embodiment, the storage device 1000 may perform the operations that correspond to the first request and the second request received from the first host processor 3100 and the second host processor 4100 with different safety integrity levels by using the first function 1230 and the second function 1240 including different physical functions. The storage device 1000 may perform an operation that corresponds to the second request REQ2 of the second host processor 4100 by using the second physical function PF2 when errors are generated to the first physical function PF1 used to the operation that corresponds to the first request REQ1 received from the first host processor 3100.

In an embodiment, the operation that corresponds to the second request REQ2 received from the second host processor 4100 may need higher safety than the operation that corresponds to the first request REQ1 received from the first host processor 3100. The storage device 1000 may reduce the generation of errors to the operation that corresponds to the second request REQ2 by detecting and correcting the errors of the second physical function PF2, second_1 virtual function VF2_1, second_2 virtual function VF2_2, and second_3 virtual function VF2_3 by using the error detection function 1241 included in the second function 1240.

Figure 6:
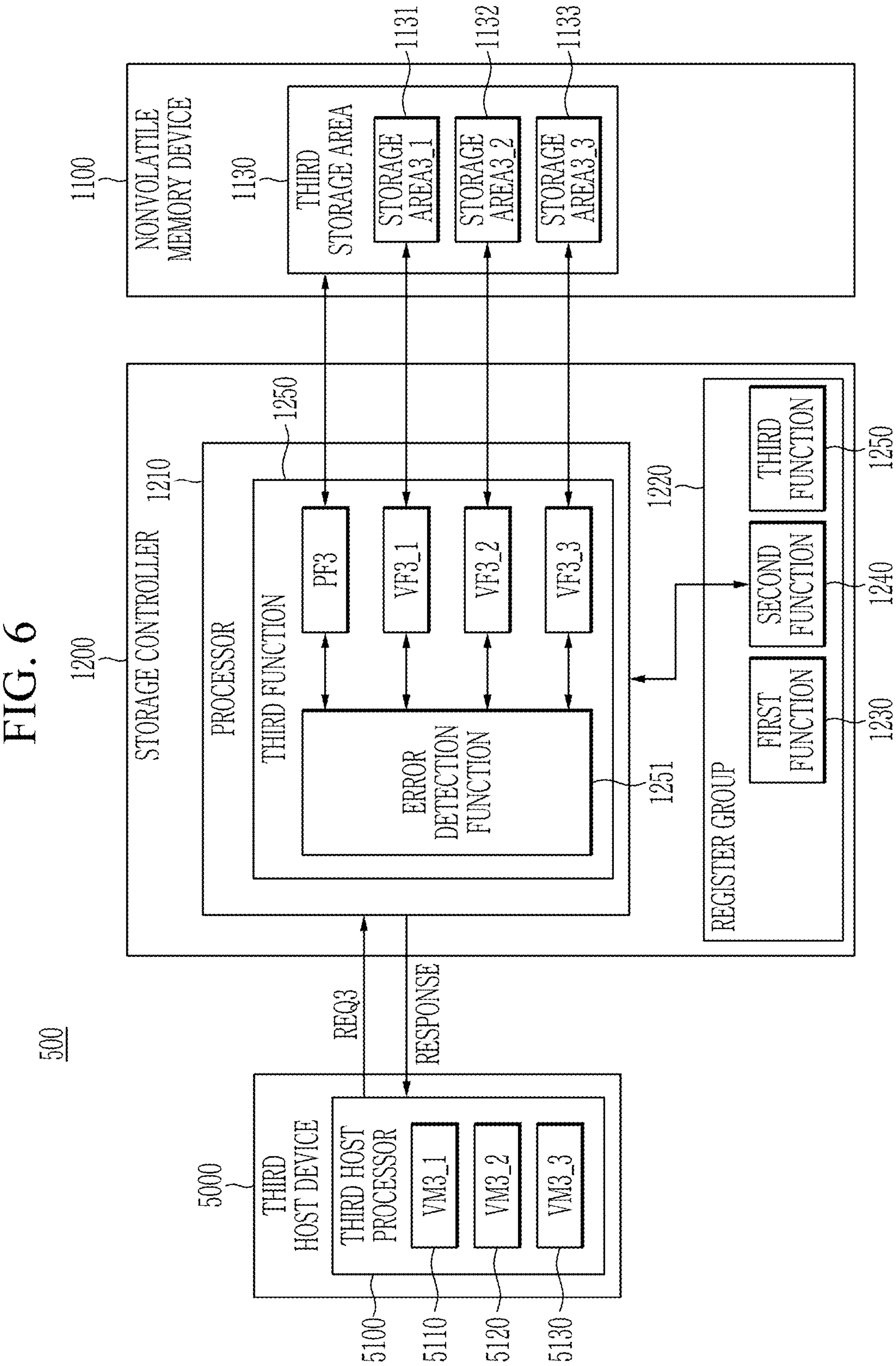
FIG. 6 shows a storage device for performing an operation that corresponds to a third request of a third host device according to an embodiment.

FIG. 6 shows a storage device for performing an operation that corresponds to a third request of a third host device according to an embodiment.

Referring to FIG. 6, the center controller 500 may include a third host device 5000, a storage controller 1200, and a nonvolatile memory device 1100. The third host device 5000 may include a third host processor 5100. The nonvolatile memory device 1100 may include a third storage area 1130. The third storage area 1130 may include a third_1 storage area 1131, a third_2 storage area 1132, and a third_3 storage area 1133.

In an embodiment, the third host device 5000 may have the safety integrity level that is different from those of the first host device 3000 and the second host device 4000. In an embodiment, the third host device 5000 may have the third safety integrity level that is higher than the first safety integrity level of the first host device 3000 and is lower than the second safety integrity level of the second host device 4000. For example, the first host device 3000 may correspond to the QM level, the second host device 4000 may correspond to the ASIL-D, and the third host device 5000 may correspond to the ASIL-B.

In another embodiment, the third host device 5000 may have the safety integrity level that is higher than that of the first host device 3000, and may have the same safety integrity level as the second host device 4000. For example, the first host device 3000 may correspond to the QM level, and the second host device 4000 and the third host device 5000 may correspond to the ASIL-D.

In an embodiment, the third host processor 5100 may perform the virtual machines, the operating systems, or the applications. In an embodiment, the third host processor 5100 may perform the third_1 virtual machine 5110, the third_2 virtual machine 5120, and the third_3 virtual machine 5130.

In an embodiment, the third host processor 5100 may control an operation that corresponds to the third safety integrity level. In an embodiment, the third host processor 5100 may transmit the third request REQ3 for instructing to store or read the data used to the operation that corresponds to the third safety integrity level to the storage controller 1200. For example, the operation that corresponds to the third safety integrity level may process data relating to a rear-view camera or control such as a stop.

The storage controller 1200 may receive the third request REQ3 from the third host processor 5100. In an embodiment, the third request REQ3 may correspond to the third safety integrity level. For example, the third request REQ3 that corresponds to the third safety integrity level may instruct to store or read the data relating to the rear-view camera or control such as a stop. The storage controller 1200 may control the nonvolatile memory device 1100 to perform an operation that corresponds to the third request REQ3 based on the third function 1250 in response to the third request REQ3 of the third host processor 5100.

In an embodiment, the processor 1210 may access the register group 1220 in response to the third request REQ3, and may obtain the third function 1250 stored in the register group 1220. The third function 1250 may include a third physical function PF3, a third_1 virtual function VF3_1, a third_2 virtual function VF3_2, a third_3 virtual function VF3_3, and an error detection function 1251. In an embodiment, the error detection function 1251 included in the third function 1250 may be realized to be identical to the error detection function 1241 included in the second function 1240.

In an embodiment, the processor 1210 may control the nonvolatile memory device 1100 to store the data received from the third host processor 5100 in the third storage area 1130 based on the third physical function PF3 in response to the third request REQ3. The processor 1210 may control the nonvolatile memory device 1100 to read the data stored in the third storage area 1130 based on the third physical function PF3 in response to the third request REQ3.

In an embodiment, the processor 1210 may access the register group 1220 in response to the third request REQ3 received from the third_1 virtual machine 5110 executed by the third host processor 5100, and may obtain the third_1 virtual function VF3_1 stored in the register group 1220. The processor 1210 may control the nonvolatile memory device 1100 to store the data in the third_1 storage area 1131 based on the third_1 virtual function VF3_1 in response to the third request REQ3 received from the third_1 virtual machine 5110. The processor 1210 may control the nonvolatile memory device 1100 to read the data stored in the third_1 storage area 1131 based on the third_1 virtual function VF3_1 in response to the third request REQ3 received from the third_1 virtual machine 5110.

In an embodiment, the processor 1210 may access the register group 1220 in response to the third request REQ3 received from the third_2 virtual machine 5120 executed by the third host processor 5100, and may obtain the third_2 virtual function VF3_2 stored in the register group 1220.

The processor 1210 may control the nonvolatile memory device 1100 to store the data in the third_2 storage area 1132 based on the third_2 virtual function VF3_3 in response to the third request REQ3 received from the third_2 virtual machine 5120. The processor 1210 may control the nonvolatile memory device 1100 to read the data stored in the third_2 storage area 1132 based on the third_2 virtual function VF3_2 in response to the third request REQ3 received from the third_2 virtual machine 5120.

In an embodiment, the processor 1210 may access the register group 1220 in response to the third request REQ3 received from the third_3 virtual machine 5130 executed by the third host processor 5100, and may obtain the third_3 virtual function VF3_3 stored in the register group 1220.

The processor 1210 may control the nonvolatile memory device 1100 to store the data in the third_3 storage area 1133 based on the third_3 virtual function VF3_3 in response to the third request REQ3 received from the third_3 virtual machine 5130. The processor 1210 may control the nonvolatile memory device 1100 to read the data stored in the third_3 storage area 1133 based on the third_3 virtual function VF3_3 in response to the third request REQ3 received from the third_3 virtual machine 5130.

In an embodiment, the processor 1210 may obtain the error detection function 1251 from the third register group 1223 storing the third function 1250 from among the register groups included in the register group 1220 in response to the third request REQ3 received from the second host processor 5100.

In an embodiment, the error detection function 1251 may detect the generation of errors of the third function 1250 while the processor accesses the third register group 1223 storing the third function 1250. The error detection function 1251 may perform the recovery operation for correcting the errors generated by the third function 1250. The error detection function 1251 may provide information on the errors of the third function 1250 to the third host processor 5100.

In an embodiment, the error detection function 1251 may allow or prohibit the access to the third register group 1223 storing the third function 1250 based on the access right information included in the third request REQ3.

In an embodiment, the storage device 1000 may receive the third request REQ3 from the third host device 5000 with the safety integrity level that is different from those of the first host device 3000 and the second host device 4000, and may perform an operation that corresponds to the third request REQ3 by using the third function 1250 including the third physical function PF3 that is different from the first physical function PF1 and the second physical function PF2 used to the first request REQ1 and the second request REQ2 of the first host device 3000 and the second host device 4000.

In an embodiment, the storage device 1000 may increase the safety of the operation that corresponds to the third request REQ3 by detecting and correcting the error of the third function 1250 generated while accessing the third register group 1223 storing the third function 1250 by use of the error detection function 1251 included in the third function 1250.

Figure 7:
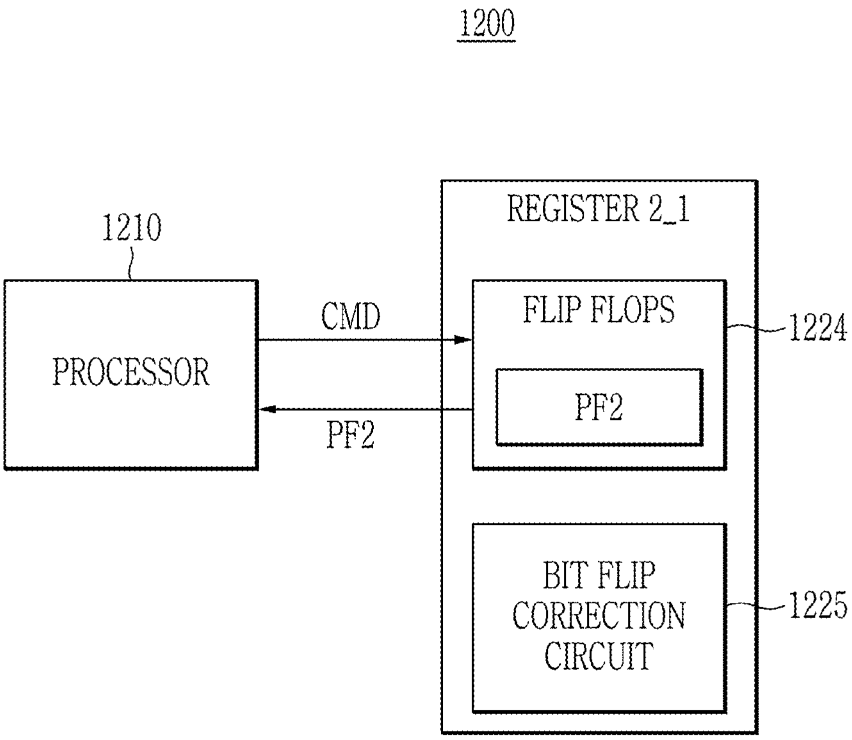
FIG. 7 shows a register including a bit flip correcting circuit according to an embodiment.

FIG. 7 shows a register including a bit flip correcting circuit according to an embodiment.

Referring to FIG. 7, the storage controller 1200 may include a processor 1210 and a second_1 register REGISTER 2_1. The second_1 register REGISTER 2_1 may be included in the register group 1220 of FIG. 3.

The second_1 register REGISTER 2_1 may include flipflops 1224 and a bit flip correcting circuit 1225. The flipflops 1224 may store the second physical function PF2. The bit flip correcting circuit 1225 may detect and correct bit flips of the second physical function PF2.

In an embodiment, the processor 1210 may transmit the command CMD for obtaining the second physical function PF2 stored in the flipflops 1224 to the second_1 register REGISTER 2_1. The second_1 register REGISTER 2_1 may provide the second physical function PF2 stored in the flipflops 1224 to the processor 1210 in response to the command CMD. The processor 1210 may control the operation that corresponds to the second request REQ2 of the second host processor 4100 by using the second physical function PF2.

In an embodiment, the second physical function PF2 stored in the flipflops 1224 may generate bit flips by which bit values indicating the second physical function PF2 are changed to 0 from 1 or to 1 from 0 according to noise generated while being read in response to the command CMD.

In an embodiment, the bit flip correcting circuit 1225 may detect the bit flip generated while the second physical function PF2 stored in the flipflops 1224 is read, and may correct the bit flip. The processor 1210 may receive the second physical function PF2 of which the bit flip is corrected by the bit flip correcting circuit 1225.

FIG. 7 has described the second_1 register REGISTER 2_1, and the respective registers included in the second register group 1222 and the third register group 1223 may include the bit flip correcting circuit 1225 in a like way of the second_1 register REGISTER 2_1.

Figure 8:
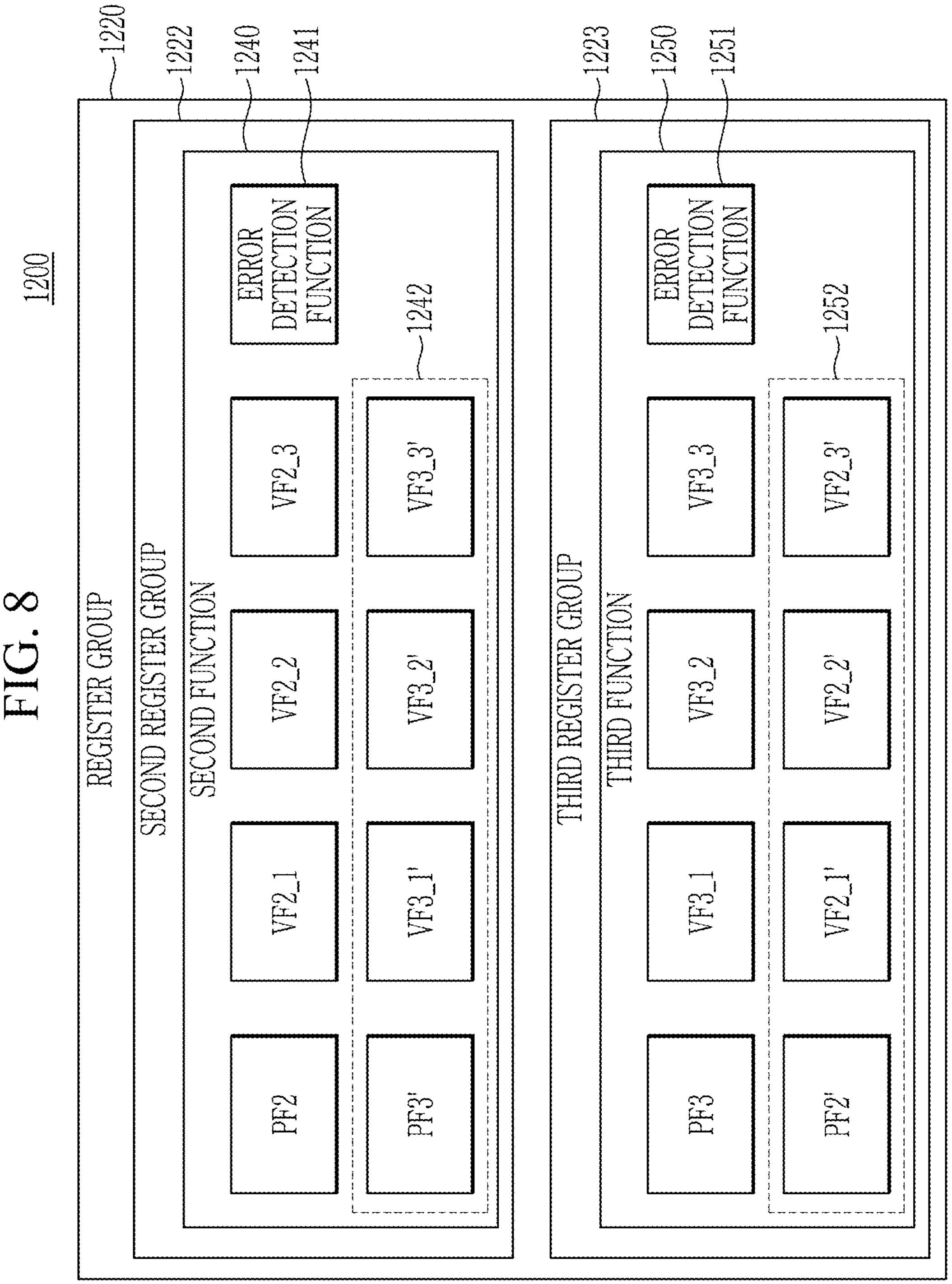
FIG. 8 shows a register group for storing a mirror function according to an embodiment.

FIG. 8 shows a register group for storing a mirror function according to an embodiment.

The first register group 1221 will not be described in FIG. 8. Referring to FIG. 8, the storage controller 1200 may include a register group 1220. The register group 1220 may include a second register group 1222 and a third register group 1223. The second register group 1222 and the third register group 1223 may include registers.

In an embodiment, the second register group 1222 may store the second function 1240. The second function 1240 may include a second physical function PF2, a second_1 virtual function VF2_1, a second_2 virtual function VF2_2, a second_3 virtual function VF2_3, an error detection function 1241, and a first mirror function 1242. The first mirror function 1242 may be a function generated by mirroring the third physical function PF3 included in the third function 1250, the third_1 virtual function VF3_1, the third_2 virtual function VF3_2, and the third_3 virtual function VF3_3.

In an embodiment, the first mirror function 1242 may include a third physical mirror function PF3' generated by mirroring the third physical function PF3, a third_1 virtual mirror function VF3_1' generated by mirroring the third_1 virtual function VF3_1, a third_2 virtual mirror function VF3_2' generated by mirroring the third_2 virtual function VF3_2, and a third_3 virtual mirror function VF3_3' generated by mirroring the third_3 virtual function VF3_3.

In an embodiment, the third register group 1223 may store the third function 1250. The third function 1250 may include a third physical function PF3, a third_1 virtual function VF3_1, a third_2 virtual function VF3_2, a third_3 virtual function VF3_3, an error detection function 1251, and a second mirror function 1252. The second mirror function 1252 may be a function generated by mirroring the second physical function PF2 included in the second function 1240, the second_1 virtual function VF2_1, the second_2 virtual function VF2_2, and the second_3 virtual function VF2_3.

In an embodiment, the second mirror function 1252 may include a second physical mirror function PF2' generated by mirroring the second physical function PF2, a second_1 virtual mirror function VF2_1' generated by mirroring the second_1 virtual function VF2_1, a second_2 virtual mirror function VF2_2' generated by mirroring the second_2 virtual function VF2_2, and a second_3 virtual mirror function VF2_3' generated by mirroring the second_3 virtual function VF2_3.

In an embodiment, the storage controller 1200 may detect generation of errors of the third function 1250 by using the first mirror function 1242 included in the second function 1240. In an embodiment, the processor 1210 may detect the generation of errors of the third function 1250 based on a result of comparing the third physical function PF3, the third_1 virtual function VF3_1, the third_2 virtual function VF3_2, and the third_3 virtual function VF3_3 included in the third function 1250 and the third physical mirror function PF3', the third_1 virtual mirror function VF3_1', the third_2 virtual mirror function VF3_2', and the third_3 virtual mirror function VF3_3' included in the first mirror function 1242.

In an embodiment, the storage controller 1200 may detect the generation of errors of the second function 1240 by using the second mirror function 1252 included in the third function 1250. In an embodiment, the processor 1210 may detect the generation of errors of the second function 1240 based on a result of comparing the second physical function PF2, the second_1 virtual function VF2_1, the second_2 virtual function VF2_2, and the second_3 virtual function VF2_3 included in the second function 1240 and the second physical mirror function PF2', the second_1 virtual mirror function VF2_1', the second_2 virtual mirror function VF2_2', and the second_3 virtual mirror function VF2_3' included in the second mirror function 1252.

Figure 9:
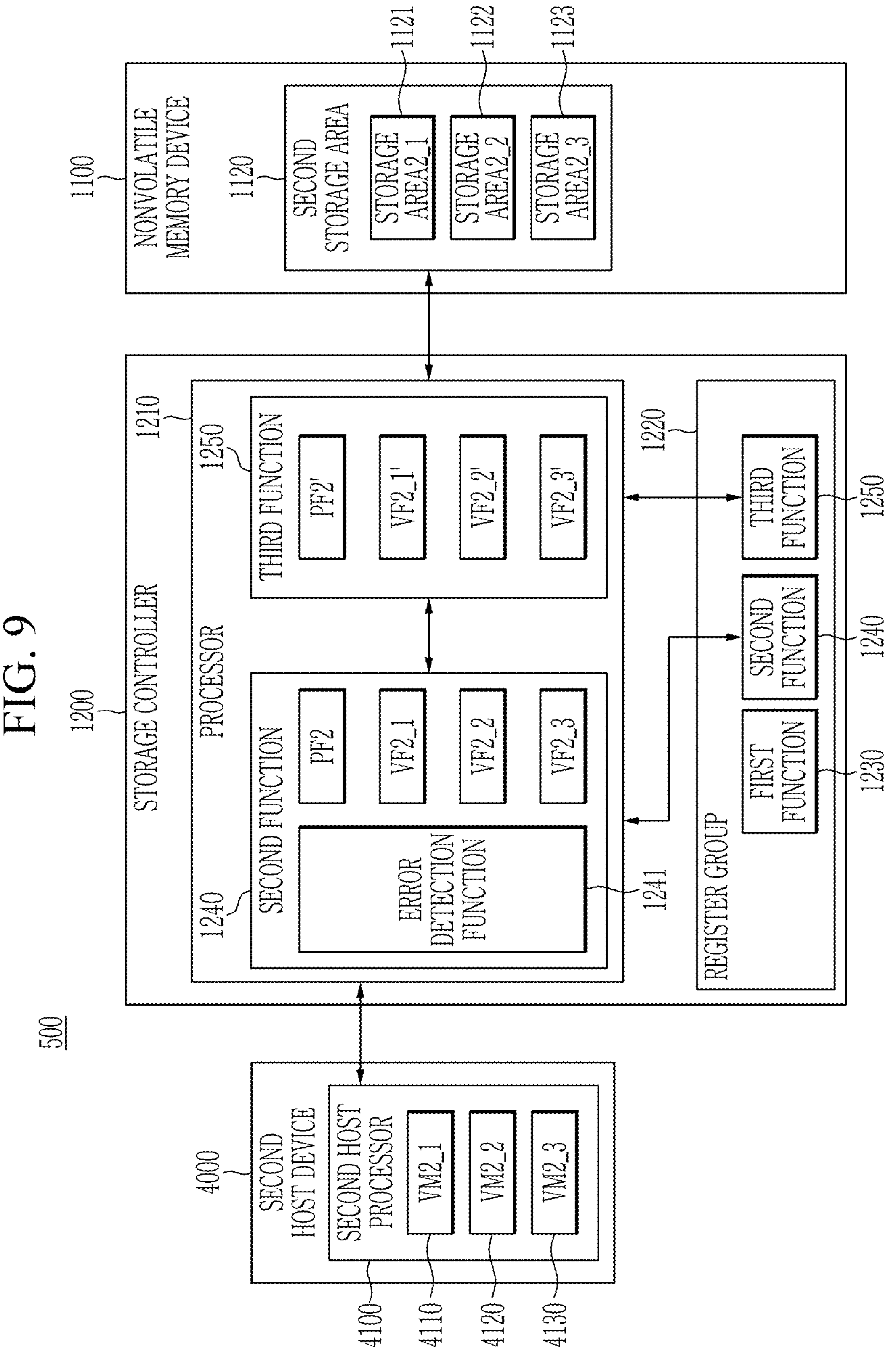
FIG. 9 shows a storage device for detecting errors of a function by use of a mirror function according to an embodiment.

FIG. 9 shows a storage device for detecting errors of a function by use of a mirror function according to an embodiment.

Referring to FIG. 9, the center controller 500 may include a second host device 4000, a storage controller 1200, and a nonvolatile memory device 1100.

In an embodiment, the processor 1210 may control the nonvolatile memory device 1100 to obtain the second function 1240 stored in the register group 1220 in response to the second request received from the second host processor 4100, and perform a write operation or a read operation on the second storage area 1120 by using the second physical function PF2, the second_1 virtual function VF2_1, the second_2 virtual function VF2_2, and the second_3 virtual function VF2_3 included in the second function 1240.

In an embodiment, the processor 1210 may access the register group 1220, and may obtain the second mirror function included in the third function 1250. The second mirror function may include a second physical mirror function PF2' generated by mirroring the second physical function PF2, a second_1 virtual mirror function VF2_1' generated by mirroring the second_1 virtual function VF2_1, a second_2 virtual mirror function VF2_2' generated by mirroring the second_2 virtual function VF2_2, and a second_3 virtual mirror function VF2_3' generated by mirroring the second_3 virtual function VF2_3.

In an embodiment, the error detect module 1241 may detect whether errors are generated to the second physical function PF2, the second_1 virtual function VF2_1, the second_2 virtual function VF2_2, and the second_3 virtual function VF2_3 while the processor 1210 accesses the register group 1220. In an embodiment, the error detect module 1241 may detect the generation of errors of the second physical function PF2, the second_1 virtual function VF2_1, the second_2 virtual function VF2_2, and the second_3 virtual function VF2_3 by using the second mirror function included in the third function 1250.

In an embodiment, the error detect module 1241 may detect the error of the second physical function PF2 based on a result of comparing the second physical function PF2 and the second physical mirror function PF2'. The error detect module 1241 may detect the error of the second_1 virtual function VF2_1 based on a result of comparing the second_1 virtual function VF2_1 and the second_1 virtual mirror function VF2_1'. The error detect module 1241 may detect the error of the second_2 virtual function VF2_2 based on a result of comparing the second_2 virtual function VF2_2 and the second_2 virtual mirror function VF2_2'. The error detect module 1241 may detect the error of the second_3 virtual function VF2_3 based on a result of comparing the second_3 virtual function VF2_3 and the second_3 virtual mirror function VF2_3'.

Figure 10:
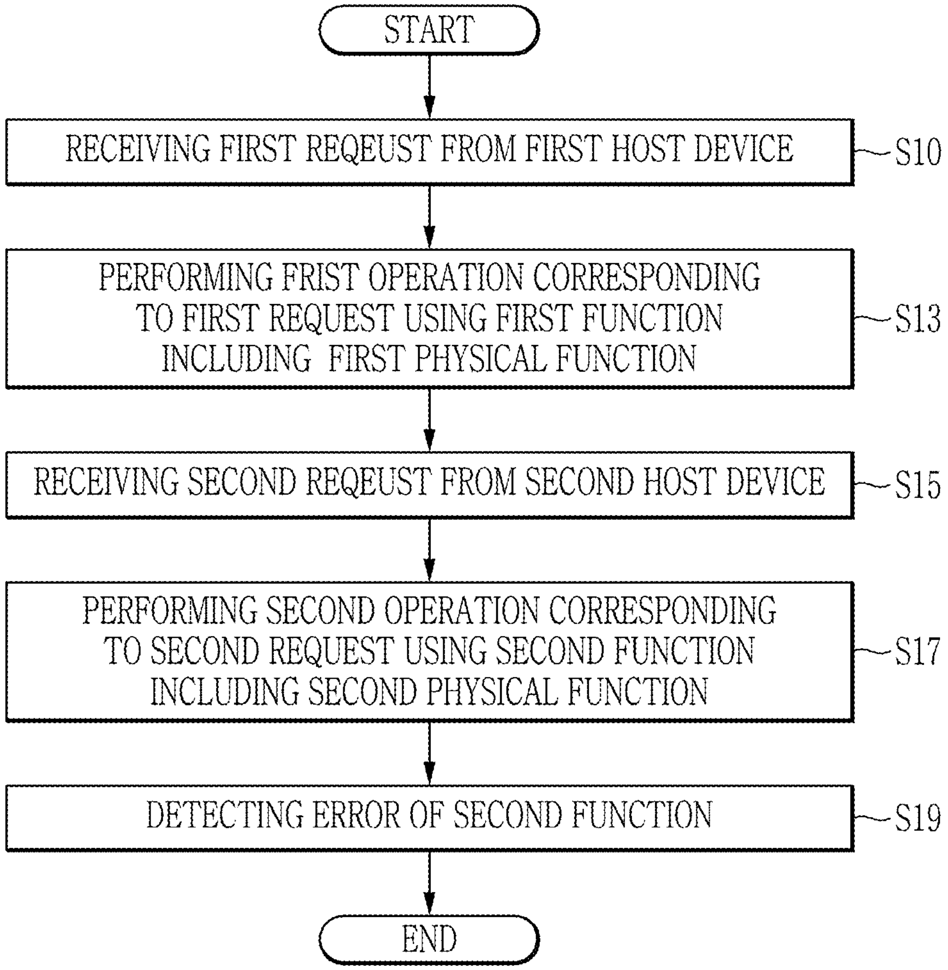
FIG. 10 shows a flowchart of a storage device for performing an operation that corresponds to a request of a host device by using functions including physical functions according to an embodiment.

FIG. 10 shows a flowchart of a storage device for performing an operation that corresponds to a request of a host device by using functions including physical functions according to an embodiment.

Referring to FIG. 10, at S10, the storage device 1000 may receive a first request from the first host device 3000. In an embodiment, the first host device 3000 may have the first safety integrity level. For example, the first host device 3000 may correspond to the QM level. For example, the first host device 3000 may perform the operation for processing the data relating to the in-vehicle infotainment.

At S13, the storage device 1000 may perform a first operation that corresponds to the first request by using the first function including the first physical function. The first operation may store the data received from the first host device 3000 or may provide the data to the first host device 3000.

At S15, the storage device 1000 may receive a second request from the second host device 4000. In an embodiment, the second host device 4000 may have the second safety integrity level that is higher than the first safety integrity level. The second host device 4000 may perform an operation that needs higher safety than the operation performed by the first host device 3000. For example, the second host device 4000 may correspond to the ASIL-D. For example, the second host device 4000 may perform an operation for processing the data relating to the ADAS.

At S17, the storage device 1000 may perform a second operation that correspond to the second request by using the second function including the second physical function. The second operation may store the data received from the second host device 4000 or may provide the data to the second host device 4000.

At S19, the storage device 1000 may detect the error of the second function. The storage device 1000 may provide information on the error of the second function to the second host device 4000.

Figure 11:
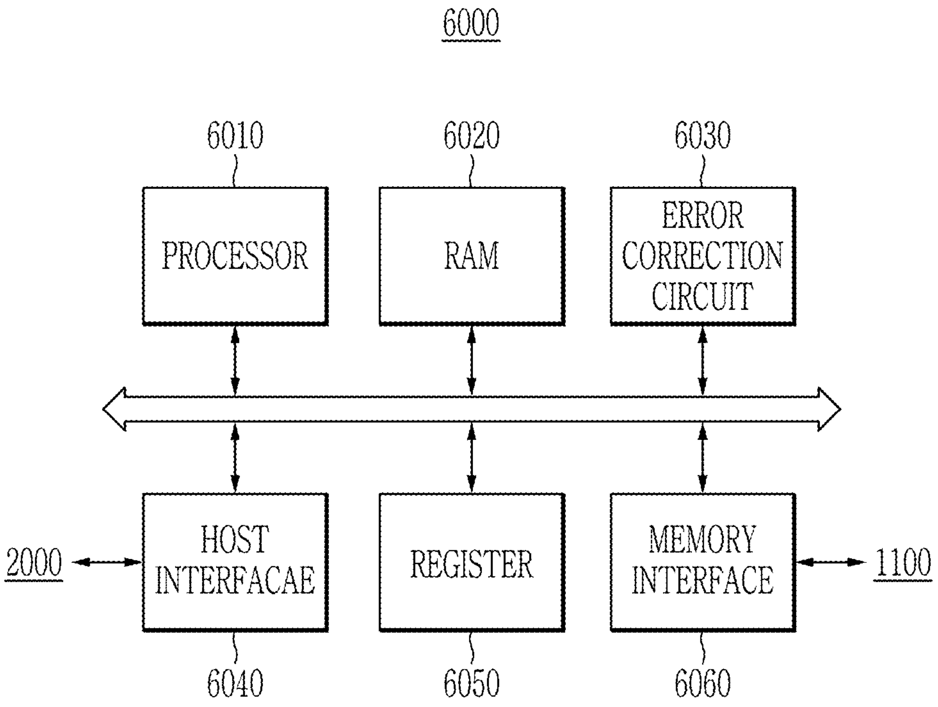
FIG. 11 shows a configuration of a storage controller according to an embodiment.

FIG. 11 shows a configuration of a storage controller according to an embodiment.

Referring to FIG. 11, the storage controller 6000 may include a processor 6010, a RAM 6020, an error correction circuit 6030, a host interface 6040, a register 6050, and a memory interface 6060.

The processor 6010 may control a general operation of the storage controller 6000. The processor 6010 may control the operation of the storage controller 6000 to store the data requested by the first host device 3000, the second host device 4000, and the third host device 5000 in the nonvolatile memory device 1100.

The RAM 6020 may be used as a buffer memory, a cache memory, or an operation memory of the storage controller 6000. In an embodiment, the RAM 6020 may temporarily store the data received from the first host device 3000, the second host device 4000, and the third host device 5000.

The error correction circuit 6030 may perform an error correction operation. In an embodiment, the error correction circuit 6030 may perform an error correction code (ECC) encoding on the data to be stored in the nonvolatile memory device 1100 through the memory interface 6060. The error correction encoded data may be transmitted to the nonvolatile memory device 1100 through the memory interface 6060. In an embodiment, the error correction circuit 6030 may perform a ECC decoding on the data received from the nonvolatile memory device 1100.

The register 6050 may store the first function including the first physical function, the second function including the second physical function, and the third function including the third physical function. The first function may be used in performing the operation that corresponds to the first request received from the first host device 3000. The second function may be used in performing an operation that corresponds to the second request received from the second host device 4000. The third function may be used in performing the operation that corresponds to the third request received from the third host device 5000.

The storage controller 6000 may communicate with the PCIe switch 2000 through the host interface 6040. The host interface 6040 may transmit/receive data to/from the first host device 3000, the second host device 4000, and the third host device 5000 through the PCIe switch 2000.

The storage controller 6000 may communicate with the nonvolatile memory device 1100 through the memory interface 6060. The storage controller 6000 may provide commands, addresses, and data to the nonvolatile memory device 1100 through the memory interface 6060.

Figure 12:
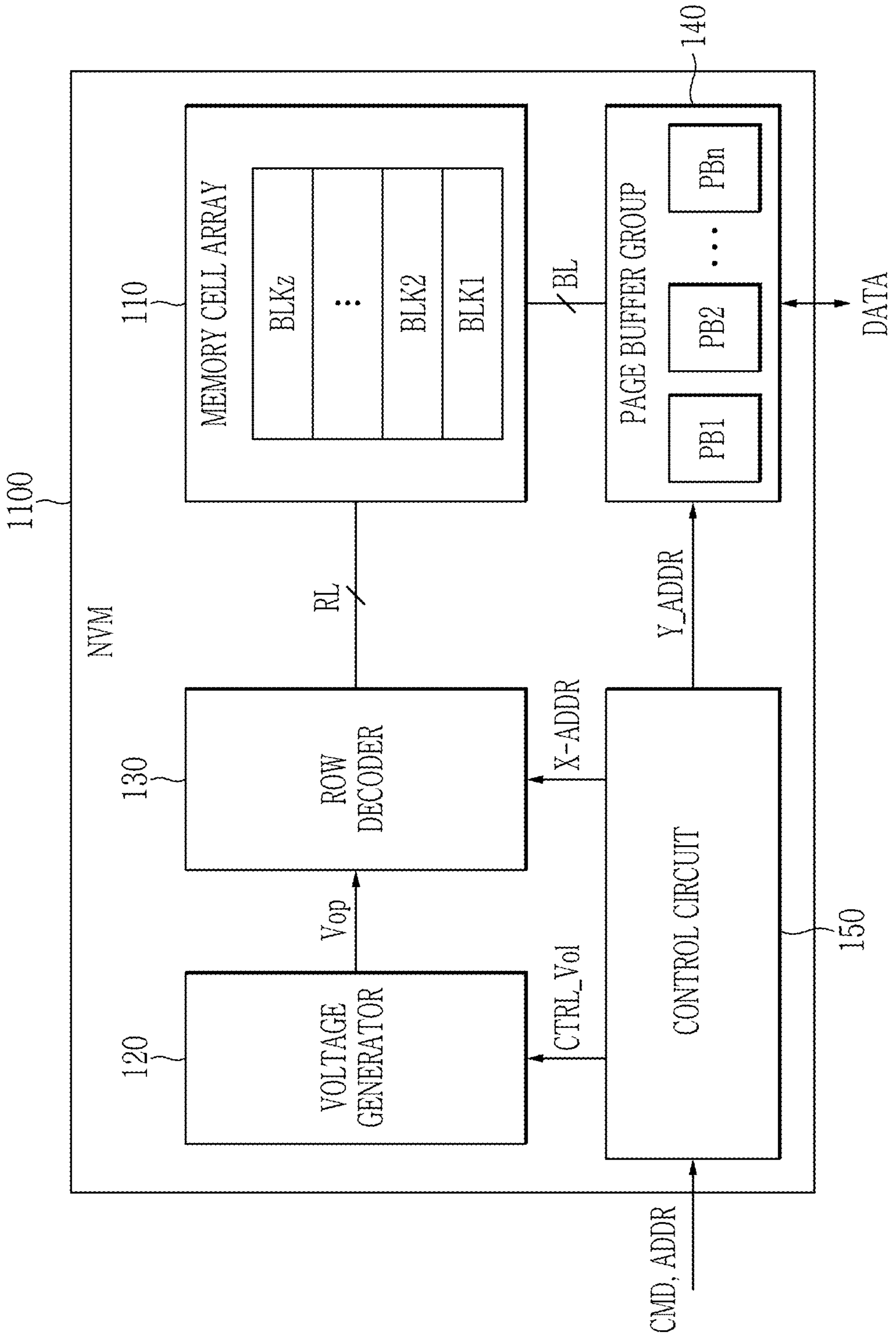
FIG. 12 shows a configuration of a nonvolatile memory device according to an embodiment.

FIG. 12 shows a configuration of a nonvolatile memory device according to an embodiment.

Referring to FIG. 12, the nonvolatile memory device 1100 may include a memory cell array 110, a voltage generator 120, a row decoder 130, a page buffer group 140, and a control circuit 150.

The memory cell array 110 may include memory blocks BLK1 to BLKz. The memory blocks BLK1 to BLKz may be connected to the row decoder 130 through the row lines RL. The memory blocks BLK1 to BLKz may be connected to the page buffer group 140 through the bit lines BL. In an embodiment, the memory blocks BLK1 to BLKz may include a first storage area, a second storage area, and a third storage area.

The respective memory blocks BLK1 to BLKz may include memory cells. In an embodiment, the memory cells may be nonvolatile memory cells.

The voltage generator 120 may generate operating voltages Vop by using an external power voltage supplied to the nonvolatile memory device 1100. The voltage generator 120 may be operated in response to control by the control circuit 150.

In an embodiment, the voltage generator 120 may generate the operating voltages Vop used to the program operation, the read operation, and the erase operation. For example, the voltage generator 120 may generate an erase voltage, a program voltage, a pass voltage, and a read voltage. The operating voltages Vop may be supplied to the memory cell array 110 by the row decoder 130.

The row decoder 130 may be connected to the memory cell array 110 through the row lines RL. The row lines RL may include drain selecting lines, word lines, and source selecting lines.

The row decoder 130 may be operated in response to the control by the control circuit 150. The row decoder 130 may receive a row address X-ADDR from the control circuit 150. In an embodiment, the row decoder 130 may select at least one of the word lines based on the row address X-ADDR, and may apply the operating voltages Vop provided by the voltage generator 120 to the at least one word line.

In an embodiment, the row decoder 130 may apply the program voltage to the selected one of the word lines and may apply the pass voltage that has a lower level than the program voltage to the non-word lines during the program operation. The row decoder 130 may apply a verify voltage to the selected word line and may apply a verification pass voltage that has the higher level than a verifying voltage to the non-selected word lines during the program verifying operation.

The row decoder 130 may apply the read voltage to the selected word line and may apply a read pass voltage that has the higher level than the read voltage to the non-selected word lines during the read operation.

The page buffer group 140 may include page buffers PB1 to PBn. The page buffers PB1 to PBn may be respective connected to the memory cell array 110 through the bit lines BL. The page buffers PB1 to PBn may be operated in response to the control by the control circuit 150.

In an embodiment, the page buffers PB1 to PBn may receive data DATA from outside the memory device. The page buffers PB1 to PBn may select at least one of the bit lines BL based on a column address Y-ADDR received from the control circuit 150.

In an embodiment, the page buffers PB1 to PBn may transmit the data received from outside the memory device to the memory cells of the memory cell array 110 through the bit lines BL during the program operation. The memory cells may be programmed according to the received data. The page buffers PB1 to PBn may sense the data stored in the memory cells through the bit lines BL during the program verifying operation.

The page buffers PB1 to PBn may sense the data stored in the memory cells through the bit lines BL and may store the sensed data in the page buffers PB1 to PBn during the read operation.

The control circuit 150 may be connected to the voltage generator 120, the row decoder 130, and the page buffer group 140. The control circuit 150 may control the general operation of the nonvolatile memory device 1100. The control circuit 150 may be operated in response to the command CMD transmitted from the outside. The control circuit 150 may generate various signals in response to the command CMD and the address ADDR may control the voltage generator 120, the row decoder 130, and the page buffer group 140.

Although an embodiment of the present disclosure has been described in detail above, the scope of the present disclosure is not limited thereto, and a person of an ordinary skill in using the basic concept of the present disclosure defined in the following claims range Various modifications and improvements of the art also belong to the scope of the present disclosure. What is claimed is:

The invention claimed is:

1. An automotive storage device comprising:
- a nonvolatile memory device configured to store data; and
- a storage controller configured to receive a first request from a first host having a first safety integrity level, control the nonvolatile memory device so that the nonvolatile memory device performs an operation corresponding to the first request by using a first function including a first physical function associated with the first host based on the first safety integrity level,
  - receive a second request from a second host having a second safety integrity level that is different from the first safety integrity level, and
  - control the nonvolatile memory device so that the nonvolatile memory device performs an operation corresponding to the second request by using a second function including a second physical function associated with the second host based on the second safety integrity level.

2. The automotive storage device of claim 1, wherein
- the second function includes an error detection function for detecting generation of errors of the second function.

3. The automotive storage device of claim 2, wherein
- the error detection function is configured to allow access to registers storing the second function based on access right information included in the second request.

4. The automotive storage device of claim 1, wherein
- the storage controller includes registers storing the second function, and
- the registers include bit flip correcting circuits for detecting bit flips of the second function.

5. The automotive storage device of claim 1, wherein
- an operation corresponding to the first request stores or reads data relating to an in-vehicle infotainment, and
- an operation corresponding to the second request corresponds to a safety integrity level that is higher than that of the first host, the operation corresponding to the first request, and stores or reads data relating to control of an air bag, an anti-lock brake, and a power steering of a vehicle.

6. The automotive storage device of claim 1, wherein
- the storage controller is configured to receive a third request from a third host having a third safety integrity level that is different from the first safety integrity level, and control the nonvolatile memory device so that the nonvolatile memory device performs an operation corresponding to the third request by using a third function including a third physical function.

7. The automotive storage device of claim 6, wherein
- the operation corresponding to the third request corresponds to the third safety integrity level that is lower than that of an operation corresponding to the second request, and stores or reads data relating to a rear-view camera of a vehicle or control of a stop.

8. The automotive storage device of claim 6, wherein
- the third function includes a mirror function generated by mirroring the second function, and
- the storage controller is configured to detect an error of the second function based on a result of comparing the second function and the mirror function.

9. The automotive storage device of claim 1, wherein
- the first function includes a first virtual function,
- the second function includes a second virtual function,
- the first virtual function corresponds to a first virtual machine executed by the first host, and
- the second virtual function corresponds to a second virtual machine executed by the second host.

10. The automotive storage device of claim 9, wherein
- the nonvolatile memory device includes storage areas, and
- the storage controller is configured to control the nonvolatile memory device to store the data generated by the second virtual machine in a storage area corresponding to the second virtual function from among the storage areas based on the second virtual function in response to the second request.

11. An automotive storage controller comprising:
- first registers configured to store a first function including a first physical function;
- second registers configured to store a second function including a second physical function; and
- a processor configured to receive a first request corresponding to a first safety integrity level from outside the automotive storage controller having the first safety integrity level, generate a command for performing an operation corresponding to the first request based on the first function based on the first safety integrity level, receive a second request corresponding to a second safety integrity level from outside the automotive storage controller having the second safety integrity level, generate a command for performing an operation corresponding to the second request based on the second function based on the second safety integrity level, and detect generation of errors of the second function while accessing the second registers.

12. The automotive storage controller of claim 11, wherein
- the second function includes an error detection function for allowing an access to the second registers based on access right information included in the second request.

13. The automotive storage controller of claim 11, further comprising third registers configured to store a third function including a third physical function, wherein the processor is configured to receive a third request corresponding to a third safety integrity level that is lower than the second safety integrity level from outside the automotive storage controller, and generate a command for performing an operation corresponding to the third request based on the third function.

14. The automotive storage controller of claim 13, wherein the operation corresponding to the second request stores or reads the data relating to control of an air bag, an anti-lock brake, and a power steering of a vehicle, and the operation corresponding to the third request stores or read the data relating to a rear-view camera of the vehicle or control of a stop.

15. The automotive storage controller of claim 13, wherein the second function includes a mirror function generated by mirroring the third function, and the processor is configured to detect an error of the third function based on a result of comparing the third function and the mirror function.

16. An automotive electronic system comprising:

a first host processor with a first safety integrity level;

a second host processor with a second safety integrity level that is higher than the first safety integrity level; and an automotive storage device configured to perform an operation corresponding to a first request of the first host processor based on a first function including a first physical function in response to the first request, and perform an operation corresponding to a second request of the second host processor based on a second function including a second physical function in response to the second request, wherein the automotive storage device is configured to associate the first physical function with the first host processor based on the first safety integrity level and associate the second physical function with the second host processor based on the second safety integrity level.

17. The automotive electronic system of claim 16, wherein the automotive storage device includes a storage controller configured to detect an error of the second function while performing an operation corresponding to the second request.

18. The automotive electronic system of claim 16, further comprising a third host processor with the second safety integrity level, wherein the automotive storage device is configured to receive a third request of the third host processor, and access registers storing a third function including a third physical function based on access right information included in the third request.

19. The automotive electronic system of claim 16, wherein the first function includes first virtual functions, the second function includes second virtual functions, the first virtual functions correspond to operating systems or applications performed by the first host processor, and the second virtual functions correspond to operating systems or applications performed by the second host processor.

20. The automotive electronic system of claim 16, wherein the first host processor is configured to process data relating to an automotive infotainment, and the second host processor is configured to process data relating to an advanced driver assistance system (ADAS).

* * * * *